United States Patent [19]

Arndt et al.

[11] 4,050,984
[45] Sept. 27, 1977

[54] CLOSED CYCLE GAS COOLANT NUCLEAR POWER PLANT

[75] Inventors: Erhard Arndt, Viernheim; Nikolaus Brodmann, Unterflockenbach; Horst R. Roser, Hemsbach-Entenweide, all of Germany

[73] Assignee: Hochtemperatur-Reaktorbau GmbH, Cologne, Germany

[21] Appl. No.: 652,844

[22] Filed: Jan. 27, 1976

Related U.S. Application Data

[63] Continuation-in-part of Ser. No. 391,018, Aug. 23, 1973, abandoned.

[30] Foreign Application Priority Data

Sept. 28, 1973 Germany .............................. 2241426

[51] Int. Cl.² ............................................ G21C 19/28
[52] U.S. Cl. ......................................... 176/60; 176/65; 176/87
[58] Field of Search ...................... 176/38, 60, 65, 87; 60/644, 679, 687

[56] References Cited

U.S. PATENT DOCUMENTS

| | | | |
|---|---|---|---|
| 3,192,121 | 6/1965 | Challender et al. | 176/60 |
| 3,234,102 | 2/1966 | Brown et al. | 176/60 |
| 3,371,017 | 2/1968 | Coast et al. | 176/60 X |
| 3,377,800 | 4/1968 | Spillmann | 176/60 X |
| 3,663,364 | 5/1972 | Thompson et al. | 176/65 |
| 3,748,228 | 7/1973 | Zimmumann | 176/60 |
| 3,778,346 | 12/1973 | Profos | 176/60 |
| 3,788,944 | 1/1974 | Stracke et al. | 176/60 |
| 3,793,143 | 2/1974 | Muller | 176/87 |
| 3,897,838 | 8/1975 | Hosegood | 176/65 X |
| 3,929,188 | 12/1975 | Brinkmann et al. | 176/65 X |

*Primary Examiner*—Peter A. Nelson
*Attorney, Agent, or Firm*—Toren, McGeady and Stanger

[57] ABSTRACT

In a nuclear power plant, a gas cooled nuclear reactor is located within a prestressed concrete pressure tank which is enclosed within a safety tank. The main components of the plant are positioned within the pressure tank and include a gas turboset arranged in a horizontally extending tunnel spaced below the nuclear reactor. The main components of the plant include heat exchange equipment which is positioned in vertically extending shafts disposed in an annular arrangement within the pressure tank about the nuclear reactor. The gas coolant flows in a closed cycle through the plant from the nuclear reactor to the turbine in the turboset and then into the heat exchange equipment which includes recuperators, precoolers and intermediate coolers disposed in symmetrically arranged groups located in the vertically extending shafts.

10 Claims, 8 Drawing Figures

CLOSED CYCLE GAS COOLANT NUCLEAR POWER PLANT

This application is a continuation-in-part of Ser. No. 391,018, filed Aug. 23, 1973 and now abandoned.

BACKGROUND OF THE INVENTION

The present invention is directed to a closed cycle gas-cooled nuclear power plant including a high-temperature nuclear reactor, a gas turboset, heat exchange apparatus consisting of recuperators, pre-coolers and intermediate coolers, and a conduit system for conducting the gas coolant through the individual components of the plant and, more particularly, it is directed to the arrangement of the plant within a prestressed concrete pressure tank (cycle-tank construction). Closed cycle plants have an obvious advantage over nuclear power plants of the type where the energy is given off in a secondary cycle, since they combine the simplicity and good output of single circuit plants with the advantages of gas turbines. By arranging the nuclear reactor, the gas turboset and the other cycle components in a common pressure tank (integrated construction), special connecting elements are avoided between individual parts of the plant through which the gas coolant flows and, as a result, a very favorable effect is obtained in the construction and operation of high-temperature reactors. Therefore, an integrated construction is preferred in a number of special nuclear power plant types.

In DAS 1,156,903 a power engine unit of the above type is disclosed which is used for vehicles and has a very compact design. In the turboset, the turbine and compressor are located on opposite sides of the reactor core and the common shaft is hollow and extends through the reactor core and the intermediate coolers are located in the annular space between the reactor core and the pressure tank wall. This compact design is based on the consideration that the turbine does not require attendance and, as a result, the turbine and the other cycle components cannot be disassembled.

A similar design of the nuclear reactor is contained in DOS 2,005,208, however, in that arrangement a pressure blanket is provided inside the pressure tank which is open at its end faces and is spaced from the inner wall of the tank in such a way that the heat exchanger is accommodated in the space formed.

In DOS 2,028,736 a closed cycle gas-cooled nuclear power plant is described. The power plant is of the two-tank type with the gas turbine and other components of the gas cycle positioned in a machine block formed of prestressed concrete and separated from the concrete pressure tank to afford a simpler construction of the charging and regulating unit.

A similar design of the concrete pressure tank is illustrated in DAS 1,614,610 in which two closed pressure-proof chambers are provided, with one of the chambers containing the reactor and the other serving as a containment for the remaining power plant equipment. The working medium is carried in lines which penetrate through a partition between the two pressure-proof chambers passing from the reactor to the turbine to the compressor and then back into the annular space below the reactor core. This so-called igloo-construction is technically difficult to realize and the nuclear power plant is very uneconomical, because of the manner in which it is arranged.

In DOS 2,062,934 another gas-cooled nuclear reactor is shown in an integrated construction with the gas turbine arranged in a cavity in the wall of the pressure tank surrounding the reactor core. By means of a by-pass, a portion of the cold gas coolant for the reactor core can be bypassed about the core and mixed directly with the hot gas coolant issuing from the core.

In still another nuclear power plant of the above-described type as set forth in DOS 1,764,248 the nuclear reactor and all of the coolant cycle components are arranged in closely spaced parallel vertical bores within the concrete pressure tank and the components are accessible from the exterior and passageways are provided for the cooling medium in the wall of the pressure tank and between the individual vertical bores. However, in this arrangement the cooling medium must traverse very long flow paths and the plant requires a relatively large pressure tank.

SUMMARY OF THE INVENTION

Therefore, based on the above state of the art, it is the primary object of the present invention to overcome the disadvantages of the known nuclear power plants by a special arrangement of all the plant components and the conduit system interconnecting the components which permits a compact construction of the nuclear power plant.

In accordance with the present invention, a prestressed concrete pressure tank encloses the nuclear reactor and a number of vertical shafts (pods) are formed in the tank, the vertical shafts are disposed in an annular arrangement about the vertical axis of the tank and are located radially outwardly from the reactor and inwardly from the radially outer surface of the tank. The gas turboset is arranged within the pressure tank in a horizontal position spaced below the reactor and the various heat exchange components are located in the vertical shafts. The heat exchange components include recuperators, precoolers and intermediate coolers, with the recuperators positioned in the shaft either above or below the coolers. The conduit system for the entire coolant cycle downstream from the gas turboset is divided into partial flow paths which include lines connecting the turboset to separate ring segment conduits each of which conduits is connected to a group of the recuperators and another ring segment conduit collects the gas coolant from each group after it has passed through the coolant and returns the gas into a vertical collecting main.

In accordance with the invention, the entire gas cycle is divided into several separate groups each of which has short tie lines interconnecting the gas turboset and the heat exchange components in each group. Further, ring segment conduits are associated with the inlet and outlet to each of the groups for providing a compact arrangement for supplying and collecting the gas flowing through the group. In this way an optimum distribution of the gas coolant conduit system is obtained within the pressure tank and it limits the number and the length of the individual conduits required. The hot low-pressure gas issuing from the turbine flows through the recuperators arranged in parallel within each of the groups which laterally enclose the reactor core in a blanket-like arrangement with the gas flowing upwardly and the same direction of flow is maintained in the pre-coolers located within the shafts above the recuperators, the pre-coolers cool the gas to the inlet temperature of the compressor.

The arrangement of the individual components is selected so that the plant can be arranged for any desired power increase, that is, the extrapolation to a larger or smaller power unit is readily possible, and such a feature is of great importance in the development of new nulear reactors.

Preferably, the gas turboset is located in a horizontally extending tunnel spaced a sufficient distance below the nuclear reactor so that adequate shielding of the turboset from radiation is ensured. For its assembly and disassembly, the turboset is arranged in a so-called plug-in design.

The turboset has one shaft, since a single-shaft plant has decisive advantages over a multiple-shaft plant, that is, its operating and regulating behavior are easy to control, only one shaft packing is required in the prestressed concrete tank, and the costs of a single-shaft plant are lower. In this arrangement, the turbine is rigidly coupled with the generator.

High temperature gas issuing from the nuclear reactor flows first to a collecting chamber and then over vertically arranged lines directly into the turbine inlet.

To increase the efficiency of the nuclear power plant, an intermediate cooling system is provided in the main cycle and preferably is arranged in the vertical shafts of the pressure tank. In a preferred arrangement, the intermediate coolers of the intermediate cooling system are positioned in the spaces below the recuperators in the shafts. Like the recuperators and pre-coolers, the intermediate coolers are combined in groups and each group is connected by a ring segment conduit, which, in turn, is connected to the compressor by a short tie line. Gas flowing from the intermediate coolers in each group is received in a separate ring segment conduit and a tie line carries the gas from the ring segment conduit to the high-pressure stage of the compressor. Downstream from the compressor, the gas flow is again divided over tie lines and directed to separate ring segment conduits. Each of these ring segment conduits is connected to the nests of tubes in one group of the recuperators for proportioning the flow of high-pressure gas and such gas is preheated by the low-pressure gas flowing through the recuperators about the nest of tubes. From the recuperators, radially arranged lines conduct the gas coolant back into the cold gas collecting chamber of the reactor. In this arrangement, the same number of recuperators and pre-coolers are always combined in a group.

In a plant rated at about 1,000 MW, two separate groups of recuperators and pre-coolers are provided with each group containing three recuperators and three pre-coolers interconnected by ring segment conduits. This particular arrangement represents the optimum solution, as far as the required conduit system for the plant is concerned. The two groups are symmetrically disclosed in an annular arrangement.

If a nuclear power plant of this rating is equipped with intermediate coolers, four such coolers are sufficient with two being arranged in each group and they are connected to the gas flow conduit system by a gas inlet and a gas outlet ring segment conduit.

As indicated above, the intermediate coolers improve the efficiency of the plant. However, it is possible to provide a nuclear power plant in which a reduction in efficiency is intentionally accepted by omitting the intermediate coolers for obtaining a number of other advantages. Briefly, the more important of these advantages are as follows: a considerable reduction in the size of the prestressed concrete plant, the elimination of expensive parts (that is, in addition to the intermediate coolers, armored pipes, gas coolant supply means and means for facilitating disassembly), a reduction in the cooling system, and a reduction in cycle pressure losses. In such a nuclear power plant, the gas flow from the compressor is directed into the recuperators.

Preferably, a shut-down heat elimination system is provided within the prestressed concrete pressure tank which includes, in a known manner, a blower with or without a recuperator and a cooler. This emergency cooling system, which is independent of the main coolant cycle, ensures the elimination of reactor heat if the turboset fails in a single-shaft gas turbine plant either during down time or in the event of a problem within the reactor plant. The shut-down heat elimination system can be arranged in one of the vertical shafts.

For the regulation of the single-shaft gas turboset, in addition to regulation of a bypass and the filling capacity, a frequency regulating system is provided which serves to control the frequency of the gas turboset due to the fluctuation of flow within the mains. The frequency regulating system consists of several gas storage tanks which are preferably housed in the vertical shafts. This arrangement affords particularly short flow paths for the gas as it flows back and forth between the storage tanks and the main cycle as required. Other advantages of this arrangement are the ready availability of the gas and its great safety and compactness.

Further, it is preferable if all of the main cycle fittings are arranged within the prestressed concrete pressure tank so that the safety and compactness of the plant is enhanced. The fittings within the tank are arranged so that they are accessible from the exterior of the tank.

All of the parts of the nuclear power plant carrying the gas coolant are preferably arranged within a safety tank (containment) into which access can be gained during the operation of the power plant. Further, the safety tank contains the necessary openings for the disassembly of the plant components which require maintenance and repair. The prestressed concrete tank is centered within and spaced inwardly from the safety tank and a revolving crane is located in the upper part of the safety tank for use in the disassembly of the plant components.

In a nuclear power plant rated at about 1,000 MW, it is preferably if the safety tank is provided with a cylindrical recess which can be closed in a pressure-and gas-tight manner as an enclosure for the generator rigidly coupled within the gas turboset. If necessary, the generator can be inserted into the cylindrical recess along with its foundation so that it can be disassembled.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
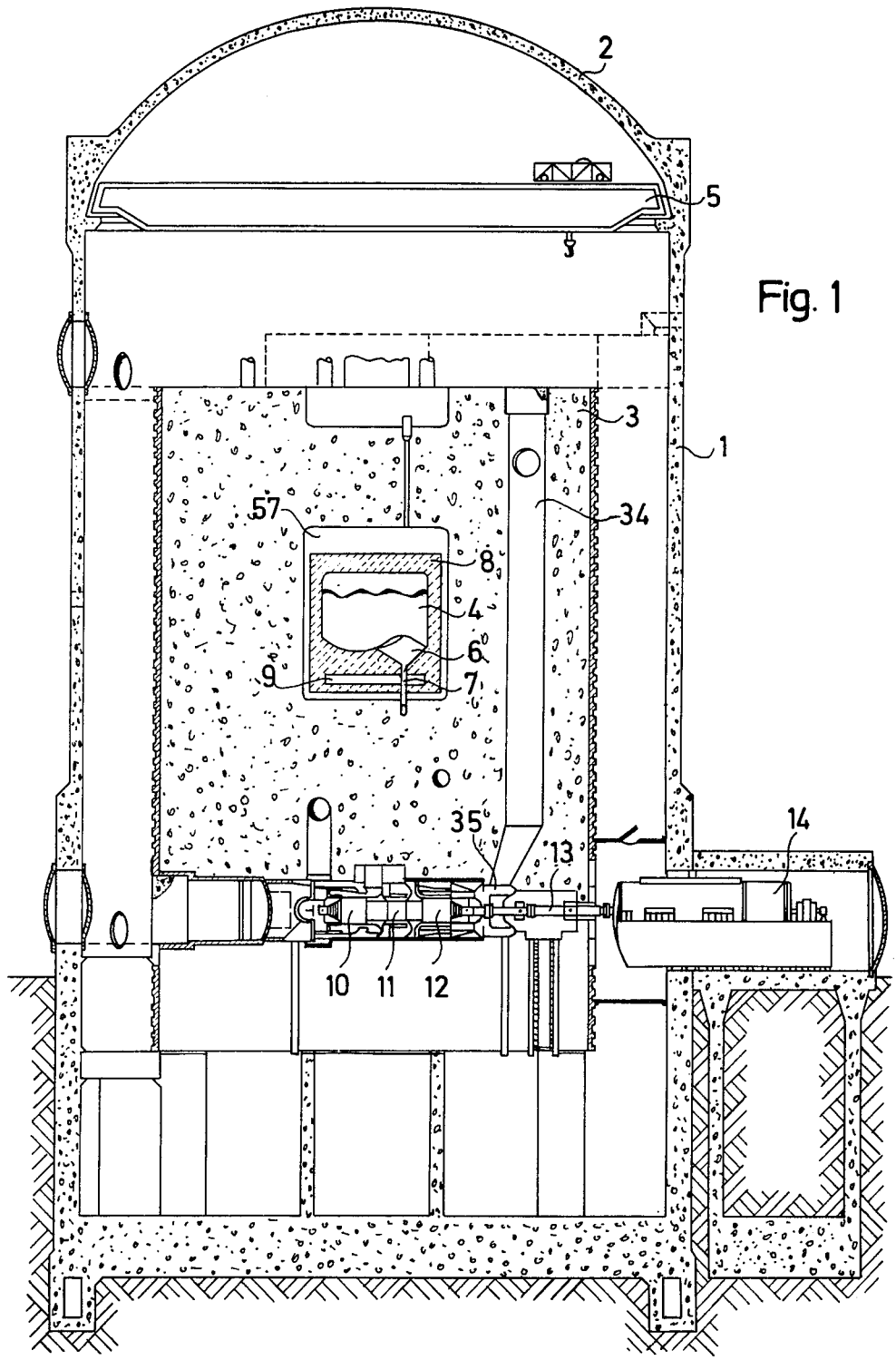
FIG. 1 is a schematic representation illustrating in vertical section a part of a nuclear reactor plant embodying the present invention.

In FIG. 1 a cylindrically-shaped pressure-tight safety tank 1 formed of steel concrete is provided with a dome-shaped top 2. Located centrally inside of and spaced inwardly from the safety tank is a cylindrically-shaped prestressed concrete pressure tank 3 which includes a high temperature nuclear reactor 4 as well as all of the main cycle components of the plant associated with the reactor. In FIG. 1 only the turboset is shown, the heat transfer components and interconnecting conduit system are not illustrated so that a clearer picture of the reactor and the turboset can be obtained.

All of the active gas-carrying auxiliary devices as well as the equipment necessary for the disassembly of the main cycle components are located within the safety tank. Of such disassembly equipment, only the revolving crane 5 which serves as the main hoisting member is shown in the drawing. The crane 5 is movably supported in a horizontal plane immediately below the plane at which the dome-shaped top is located. The working radius of the crane is such that it can be used for the disassembly of all the components located within the safety tank 1.

The high-temperature reactor 4 is a graphite-moderated, helium-cooled, pebble bed reactor having a cone 6 located at the bottom of the reactor core with a delivery pipe 7 extending downwardly from the lower end of the cone and a suspended ceiling reflector 8 located above the core. A hot gas collecting chamber 9 is located within the reactor below the core for receiving the hot gases after they pass through the pebble bed of the core and before they are circulated on to the turboset and the other components in the closed cycle provided by the plant.

The reactor 4 extends vertically and centrally within the pressure tank 3 and a horizontally arranged tunnel is spaced a sufficient distance below the reactor to ensure safe shielding from reactor radiation. A gas turboset is located within the tunnel and includes a single-shaft gas turbine 10 and a compressor consisting of a high-pressure stage 11 and a low-pressure stage 12, secured to the turbine by a common shaft 13. Aligned laterally outwardly from the turbine 10 and the compressor stages 11, 12 and exteriorly of the pressure tank 3, is a generator 14 positioned within a horizontally arranged cylindrical recess 14a extending outwardly from the outer surface of the safety tank 1. The generator 14 is rigidly coupled with the gas turbine 10. The cylindrical recess 14a is provided with a cover 14b so that access to the generator is available for disassembly, note FIG. 1. The installation of the turbine is effected by the so-called plug-in design. Two vertically extending hot gas lines 23, note FIGS. 2–6, each containing a gas fitting 24, extend between the hot gas collecting chamber 9 of the reactor, as shown in FIG. 1, and the four turbine inlets 25.

Figure 3:
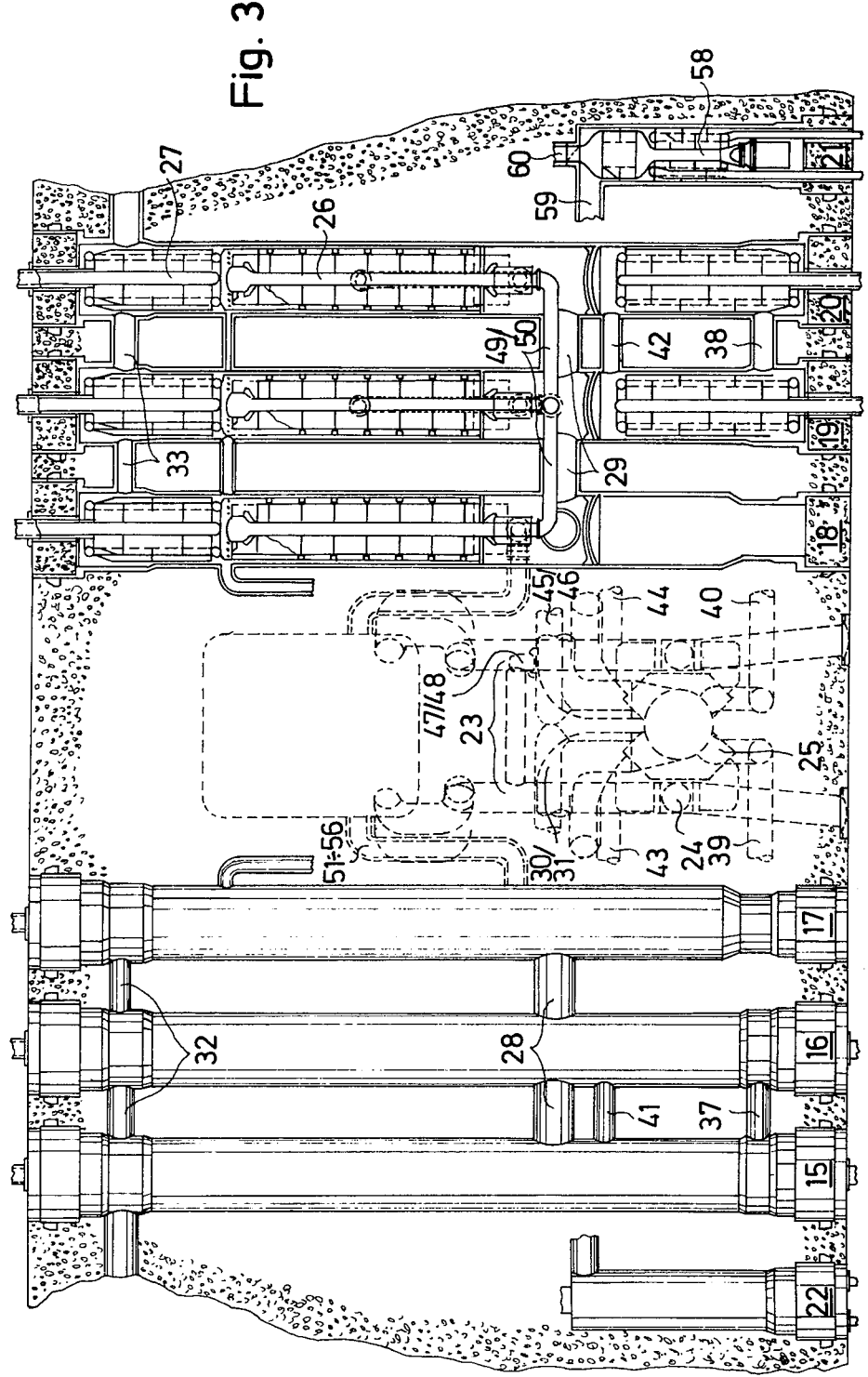
FIG. 3 is an enlarged developed representation of a portion of the plant shown in FIG. 1.

As can be seen in the four sectional views provided in FIGS. 4–7, symmetrically disposed in an annular arrangement around the vertical axis of the prestressed concrete tank are eight vertical shafts or pods 15–22 which traverse the tank for the full extent of its vertical height with the shafts being disposed radially outwardly from the reactor and radially inwardly from the outer surface of the pressure tank 3. In FIG. 3 the shafts 15–22 are shown in a developed view, that is, with the portion of the pressure tank encircling the reactor being cut and opened so that the shafts appear in a single vertical plane. However, as can be seen in the sectional views, the shafts are arranged in a ring or annular arrangement about the reactor.

Figure 4:
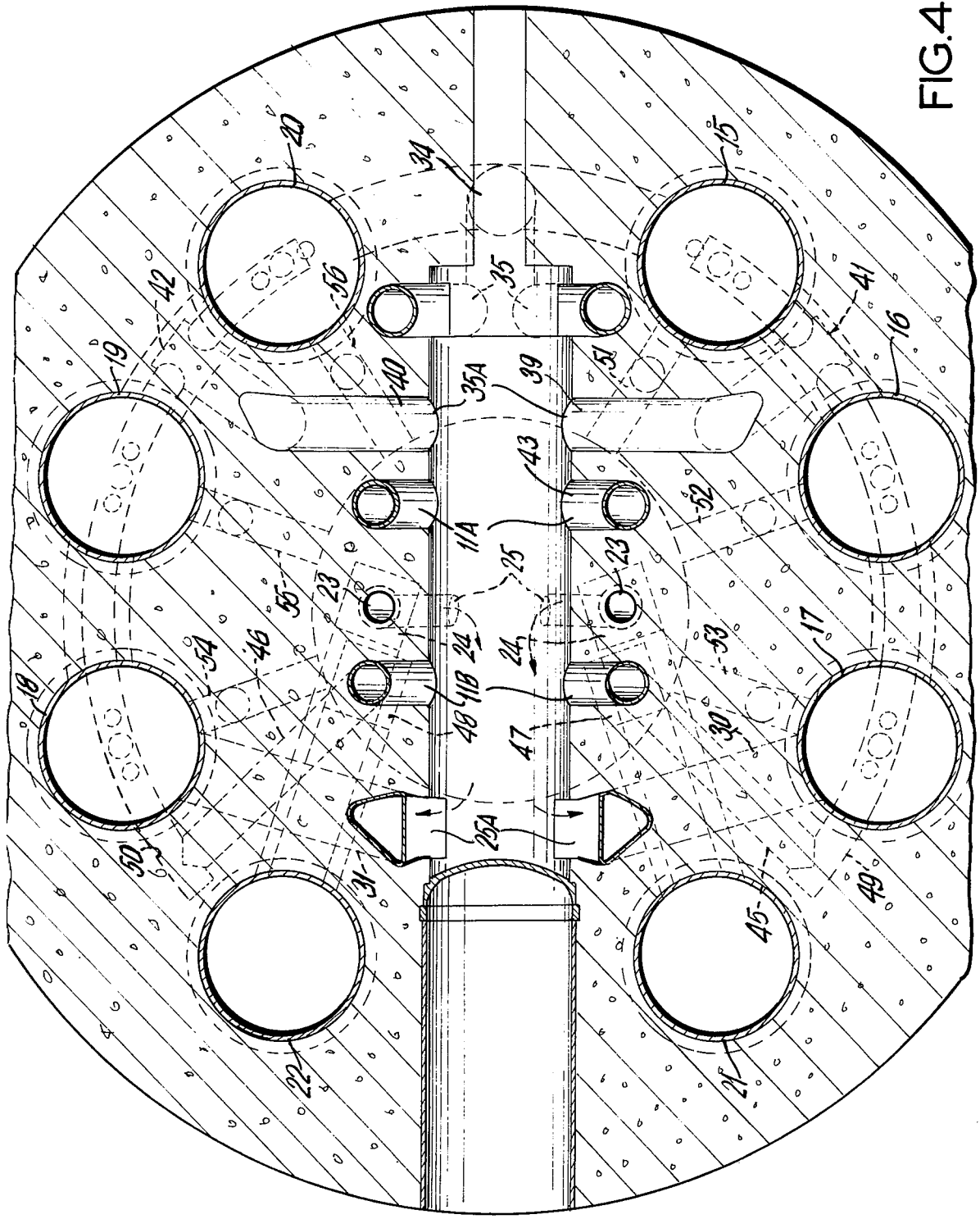
FIG. 4 is a sectional view taken along the line IV—IV in FIG. 3.
Figure 7:
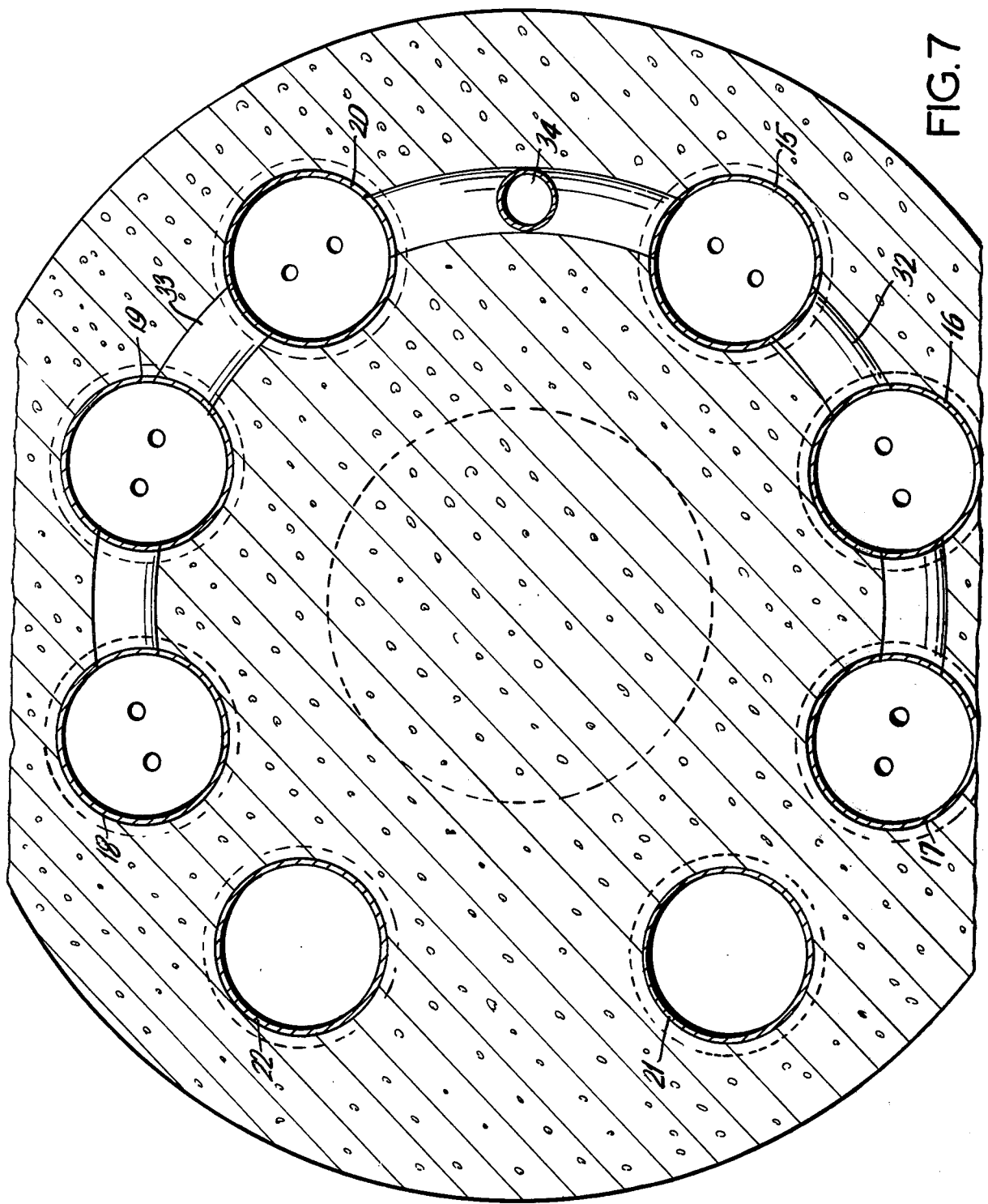
FIG. 7 is a cross-sectional view taken along the line VII—VII in FIG. 3.

In each of six of these shafts 15–20, in the vertical range comparable to that of the nuclear reactor, a recuperator 26 is positioned an above each recuperator is a pre-cooler 27. The recuperators 26 are arranged in two groups, in one group are the recuperators positioned in the vertical shafts 15, 16 and 17 and in the other group are the recuperators in shafts 18, 19 and 20. The recuperators in the vertical shafts 15, 16 and 17 are interconnected at their lower ends by means of a ring segment conduit 28 while the recuperators in the shafts 18, 19 and 20 are interconnected by another ring segment conduit 29, note FIGS. 3 and 5. Each group of vertical shafts is connected to a turbine outlet 25A over a tie line 30, 31 so that the entire outlet flow of the coolant gas from the turbine 10 is divided into two equal partial flows passing from the turbine through the tie lines 30, 31 to, as shown in FIG. 4, the shafts 17, 18. The flow into the first shafts in each of the groups is conducted to the other two shafts over the ring segment conduits 28, 29. Correspondingly, the pre-coolers 27 connected to the respective recuperators 26 in each shaft are interconnected by ring segment conduits 32, 33, at their upper ends, note FIGS. 3 and 7. A common collecting main 34 located between the shafts 15, 20, note FIG. 7, is connected to each of the ring segment conduits 32, 33 and the main passes downwardly through the pressure tank to inlets 35, note FIG. 4, into the low-pressure stage 12 of the compressor.

Figure 8:
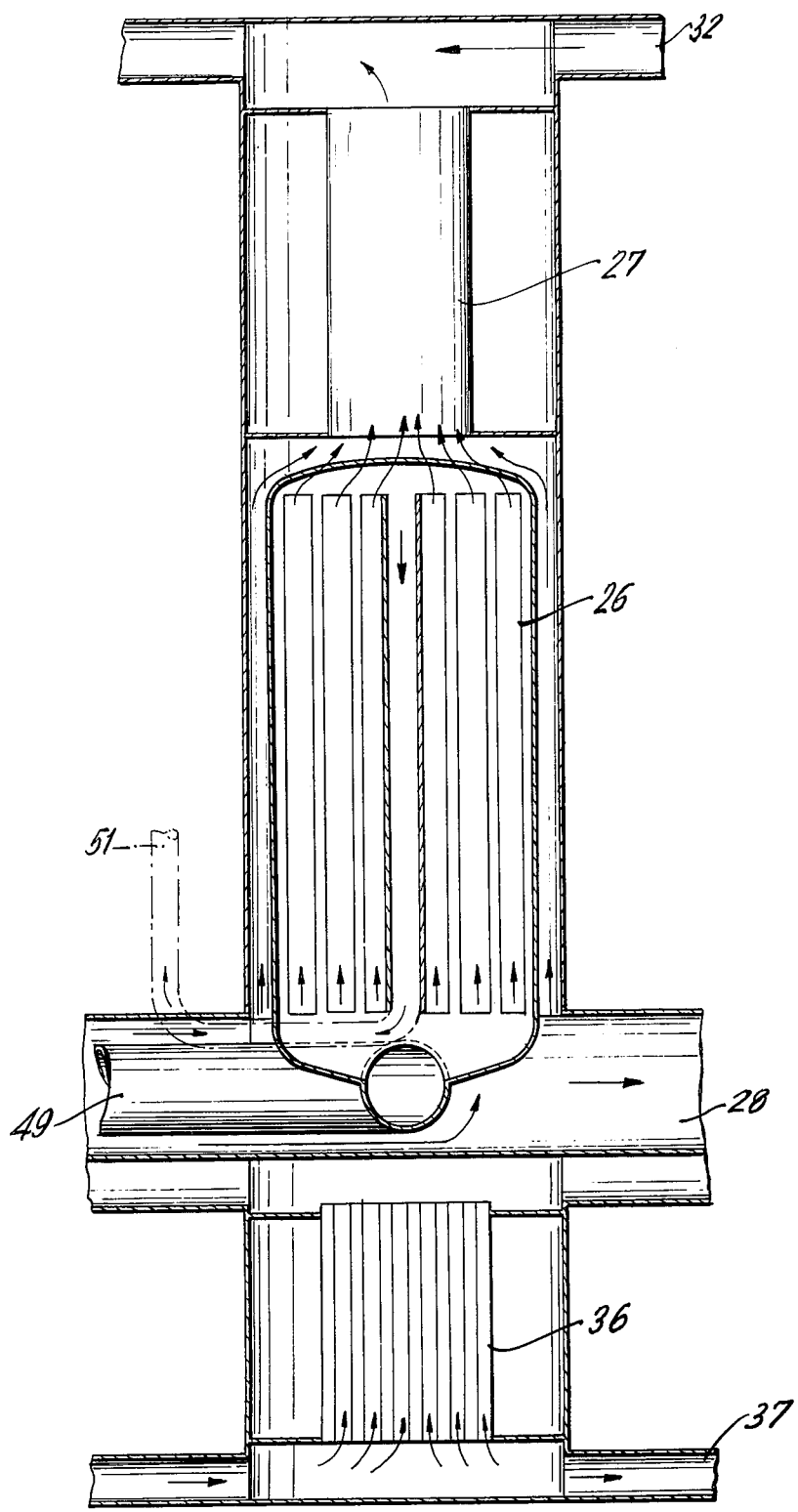
FIG. 8 is a schematic elevational view of one of the vertical shafts shown in transverse section in FIGS. 4–7.

The nuclear power plant can be equipped with four intermediate coolers 36, note FIG. 8, to improve its efficiency. Preferably, the intermediate coolers are located below the recuperators 26 in the vertical shafts 16, 17, 18 and 19. As with the recuperators and the pre-coolers located within the vertical shafts, the intermediate coolers are combined into two separate groups each interconnected by a ring segment conduit 37, 38, note FIGS. 3 and 5, and each of the conduits being connected by a tie line 39, 40 to the outlet 35A from the low-pressure stage 12 of the compressor. The ring segment conduits 37, 38 are located at the lower ends of the intermediate coolers 36 and the gases flowing through such coolers are collected at the upper ends thereof in two ring segment conduits 41, 42, note FIG. 3 and FIG. 4 and then empty into tie lines 43, 44, respectively, note FIG. 5, which lead to the inlets 11A to the high-pressure stage 11 of the compressor. The compressed gases from the outlets 11B of the high-pressure stage are conducted to the two groups of recuperators 26 through two tie lines 45, 46 each of which contains a cold gas fitting 47, 48, note FIGS. 4, 5 and 6. Since the recuperators are divided into two groups, the flow of the compressed gases through the tie lines 45, 46 are each directed into a separate ring segment conduit 49, 50, respectively, and then pass into the nests of tubes in each of the three recuperators associated with each of the two groups of heat exchange equipment. In FIG. 8, the ring segment conduit 49 is shown supplying the compressed gases into the lower end of the recuperator 26. Further, as can be seen in FIG. 8, the gases flow upwardly through the tubes within the recuperators 26 and then downwardly through a centrally arranged tube within each recuperator and finally into one of the six radially extending lines 51, 56 which convey the preheated gas from the recuperators in each of the shafts back into the cold gas collecting chamber 57, note FIG. 1, of the high-temperature reactor 4. Before the preheated gas reenters the reactor core, it flows between the thermal shield and the reflector arrangement cooling these parts, not shown. After passing through the reflector, the gas flows downwardly through the core containing the pebble bed and removes the heat generated in the fission reaction.

As viewed in FIG. 3, the two shafts 21 and 22 are displaced from the positions shown in FIGS. 4–7 for the purpose of showing the shafts 15–20 relative to the reactor 4. Each of the shafts 21, 22 contain a shut-down heat elimination system 58 in the same vertical range as the intermediate coolers 36 within the other shafts. The shut-down heat elimination system 58 is composed of a blower, recuperator and cooler. Since the heat elimination system is not the subject of the invention, its components are not represented in detail. The heat elimination system 58 takes gas from a hot gas line 59, note FIG. 3, cools it in the recuperator to about 450° C, subsequently reduces its temperature within the cooler to about 50° C and then effects a pressure increase through the blower while increasing the temperature of the gas to about 70° C. The compressed gas then flows through a centrally arranged pipe to the recuperator where it is heated to 400° C and is returned through pipe line 60 to the reactor core on the cold gas side, note the lines 59, 60 in FIG. 5. Since not all of the space within the vertical shafts 15–22 are required for the main coolant cycle components, auxiliary systems needed for the operation of the reactor can be positioned within the remaining free spaces in the shafts. Accordingly, a gas storage tank can be provided in each of the vertical shafts 17 and 18 which act as frequency regulating tanks to support frequency of the gas turbine. With this arrangement a certain amount of gas is circulated back and forth between the frequency regulating tanks, not shown, and the main coolant cycle. The pressure gradient between the two pressure levels of the main cycle is used for frequency regulating action.

The main cycle also includes a closed cooling water cycle affording a recooling system for conducting the heat resulting from energy losses to dry cooling towers for dissipation into the atmosphere. The recooling system is divided into two units each handling 50% of the output. Accordingly, two identical cooling water cycles are provided each of which gives up its heat in one of the dry cooling towers.

Figure 2:
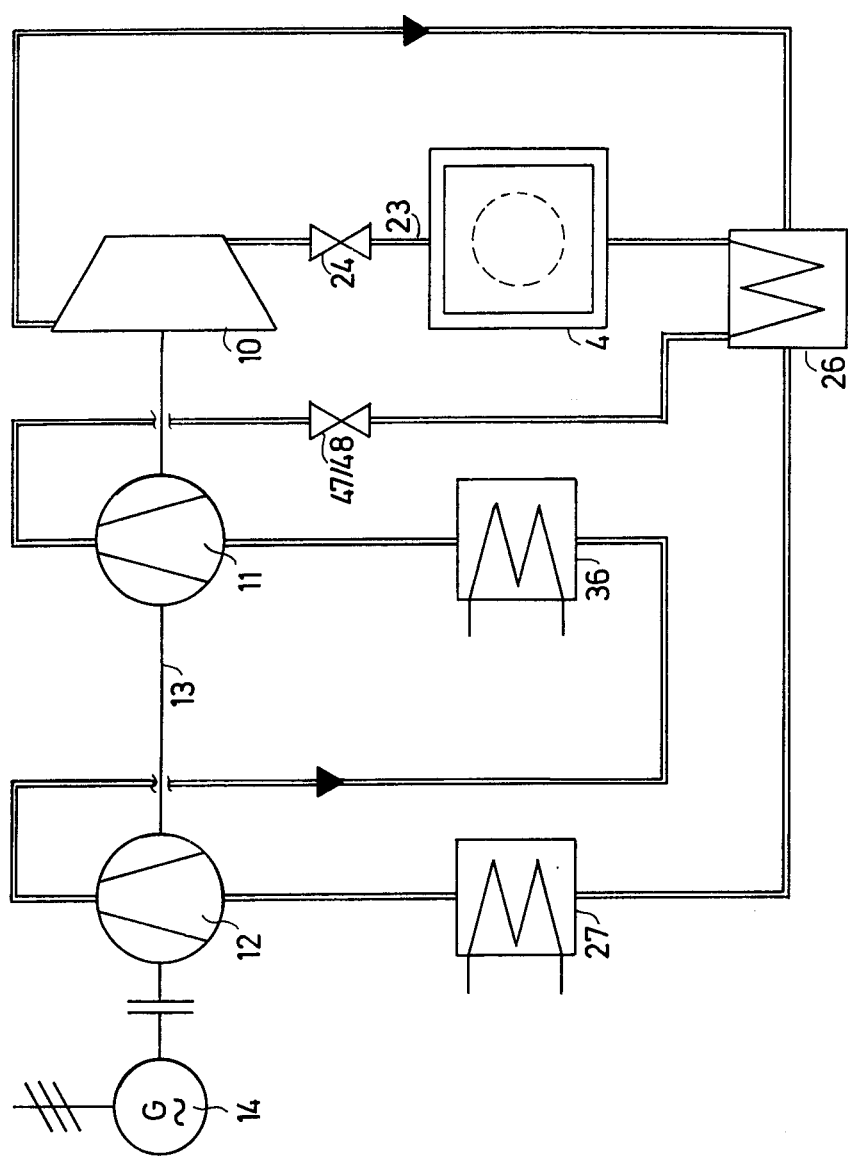
FIG. 2 is a schematic arrangement of a main coolant cycle plant shown in FIG. 1.

In FIG. 2, the closed cycle gas coolant flow through the nuclear power plant is shown in a schematic arrangement, using the same reference numerals as employed in FIGS. 1 and 3. In the main gas coolant cycle the pressure ranges between a top pressure of 64.3 bar and a bottom pressure of 19.9 bar and the temperature varies within a range of 850° C to 30° C. On the hot gas side of the cycle, the gas flows at 850° C and 60 bar directly out of the hot gas collecting chamber 9 of the reactor passing through the lines 23 and fittings 24 into the four inlets 25 into the gas turbine 10.

In the turbine 10, the working gas is expanded to 20.7 bar and at a temperature of 494° C flows through the turbine outlets 25A being divided between the two tie lines 30, 31 which are connected respectively into the shafts 17, 18, with the other two shafts in each group being connected by the ring segment conduits 28, 29. Within each of the shafts in each group, the gas flows into the recuperators 26. The recuperators, as shown in FIG. 8, consist of a number of vertically extending tubes positioned within a shell. The gas flowing through the tie lines 30, 31 flows over the nest of tubes within the recuperators. As the gas flows over the tubes it is cooled by gas flowing on the high-pressure side of the recuperators 26, that is, within the tubes, to 162.5° C and then is directed into the superposed pre-coolers 27, note FIG. 8 where the arrows indicate that the flow over the tubes is directed into the pre-cooler. In the pre-coolers 27, the gas is cooled down to the lowest cycle temperature of 30° C and then is collected in the two ring segment conduits 32, 33 located at the upper ends of the pre-coolers with both of the ring segment conduits flowing the gas into the vertical collecting main 34 which conducts it downwardly through the pressure tank into the inlets 35 to the low-pressure stage 12 of the compressor. In FIG. 1, the main 34 is shown extending downwardly through the pressure tank to the point at which it is connected to one of the inlets 35 to the low pressure stage 12, note in FIG. 4 that there are two inlets 35.

In the low-pressure stage 12 of the compressor, the gas coolant is raised to a pressure of 36.1 bar and at a temperature of 125.6° C flows from the outlets 35A of the low-pressure stage into two tie lines 39, 40 which convey the gas into the lower ends of the intermediate coolers 36. In these coolers, the gas temperature is reduced to 30° C and exits into the ring segment conduits 41, 42 for flow through the tie lines 43, 44 into the inlets 11A to the high-pressure stage 11 of the compressor at a pressure of 35.8 bar, note the tie lines 43, 44 as shown in FIGS. 4 and 5.

Figure 5:
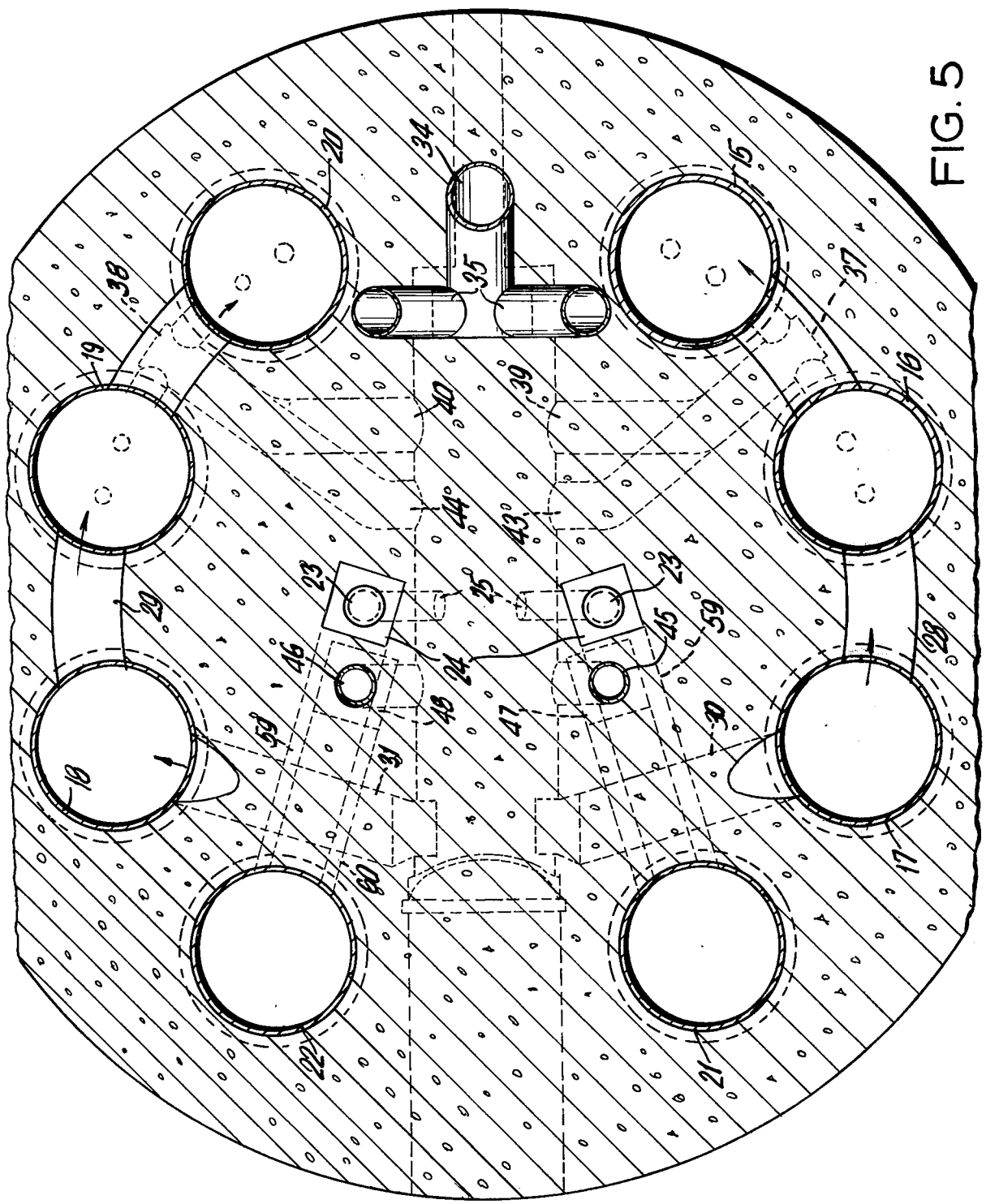
FIG. 5 is a cross-sectional view taken along the line V—V in FIG. 3.
Figure 6:
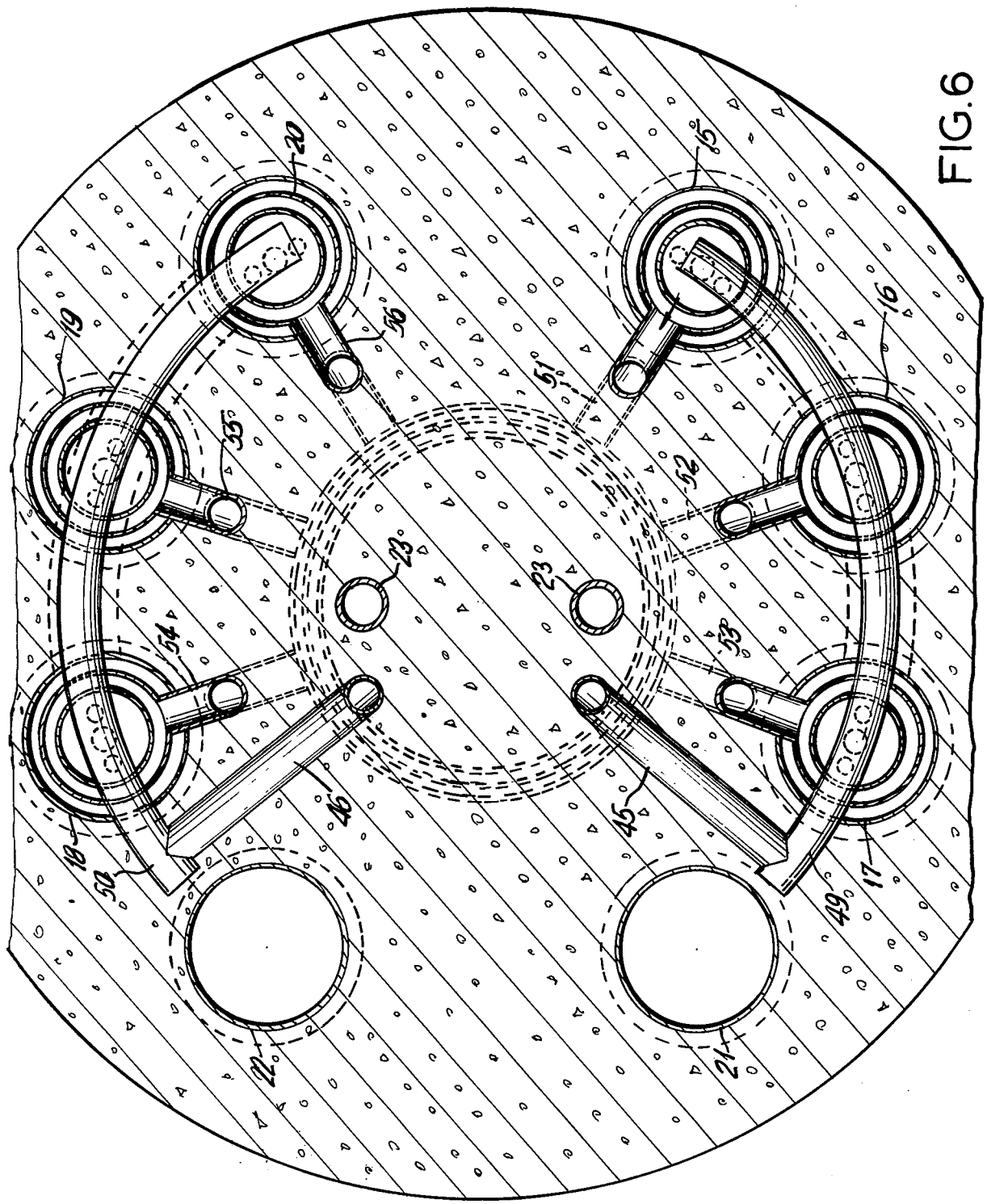
FIG. 6 is a cross-sectional view taken along the line VI—VI in FIG. 3.

Within the high-pressure stage 11, the gas is raised to the maximum cycle pressure of 64.3 bar and flows through the outlets 11B, note FIGS. 4 and 5, through the tie lines 45, 46 containing the cold gas fittings 47, 48 into the ring segment conduits 49, 50 located at the lower ends of the recuperations 26 within the shafts which distribute the gas at a temperature of 125.6° C for flow through the tubes in the recuperators 26, note FIG. 8. With the heat supplied from the low-pressure side of the recuperators 26, that is, the flow over the outside of the tubes, the high-pressure gas is brought to a temperature of 455.2° C as it flows through the recuperator. As indicated in FIG. 8, the high-pressure gas flows upwardly through the tubes and at the upper end is deflected within a plenum through 180° and flows downwardly through the central pipe in the recuperator. From the lower end of each central pipe in the recuperators 26, the gas flows into the radially extending lines 51–56, note FIG. 6, for delivery into the gas collecting chamber 57 located above the high-temperature reactor 4.

The particularly compact arrangement provided by the present invention can be appreciated most completely by considering the arrangement of the piping shown in FIGS. 4–7.

While a specific embodiment of the invention has been shown and described in detail to illustrate the application of the inventive principles, it will be understood that the invention may be embodied otherwise without departing from such principles.

What is claimed is:

1. Nuclear power plant having a gas coolant flowing in a closed cycle comprising a prestressed concrete pressure tank, a high-temperature reactor located within said tank, a gas turboset including a turbine located within said tank, heat exchange apparatus including recuperators, pre-coolers and intermediate coolers located within said pressure tank, conduit means connecting said reactor, turboset and heat exchange apparatus and forming a flow path for said gas coolant therebetween, wherein the improvement comprises that said tank has a vertically extending axis, said tank forming a horizontally extending tunnel spaced below said nuclear reactor, said turboset being positioned horizontally in the horizontally extending tunnel so that said turboset is spaced and shielded from said reactor by the portion of said concrete pressure tank disposed between said reactor and said turboset, said tank forming a plurality of vertically extending first shafts disposed in an annular arrangement about the vertical axis of said tank with said first shafts located uniformly radially outwardly from said reactor and extending from below to above said reactor, one said recuperator and one said pre-cooler located within each of said first shafts with said pre-cooler arranged to receive the flow of the gas coolant from said recuperator located in the same said first shaft, said conduit means arranged downstream in the path of said gas coolant from said turbine in said turboset is divided into at least two equal partial gas flow systems with each said system including a horizontally arranged first ring segment conduit separate from another horizontally arranged first ring segment conduit of the other said system, said recuperators in said first shafts divided into at least two separate groups with said recuperators in the same group positioned adjacent to one another, the same group of said recuperators each connected to the same said first ring segment conduit, a tie line interconnecting said turbine and the same group of said recuperators so that flow between said recuperators in the same group takes place through said first ring segment conduit, said conduit means including a horizontally arranged second ring segment conduit corresponding to each said first ring segment conduit and connected to said pre-coolers arranged in the same group with said recuperators interconnected by the corresponding said second ring segment conduit and arranged to receive the flow of said gas coolant from said recuperators connected to the corresponding said first ring segment conduit, a collecting conduit in communication with said second ring segment conduit for returning the flow of gas coolant to said turboset, each said recuperator comprises a nest of tubes, a horizontally arranged third ring segment conduit interconnecting said nests of tubes in each said recuperator within one said group of recuperators, and a tie line connecting said third ring segment to the high pressure stage of said compressor for distributing the gas proportionally to said nests of tubes in said recuperators within one said group of recuperators.

2. Nuclear power plant, as set forth in claim 1, wherein two said groups of said recuperators and pre-coolers are arranged within said pressure tank each consisting of three said recuperators and three said pre-coolers with one said first ring segment conduit interconnecting said three said recuperators in each said group, and each of said groups being arranged symmetrical to one another and to said reactor.

3. Nuclear power plant, as set forth in claim 1, wherein said turboset comprises a gas turbine, a generator, and a shaft rigidly coupling said gas turbine to said generator.

4. Nuclear power plant, as set forth in claim 1, wherein an intermediate cooler is located within at least two of said first shafts.

5. Nuclear power plant, as set forth in claim 4, wherein each said intermediate cooler is located within one of said shafts below said rectangular therein.

6. Nuclear power plant, as set forth in claim 5, wherein said turboset includes a compressor having a low-pressure stage and a high-pressure stage, at least two said intermediate coolers are located in each of said at least two groups containing said recuperators and pre-coolers, a first connecting duct interconnecting said intermediate coolers in each said group, and a tie line connecting said connecting duct to the low-pressure stage of said compressor.

7. Nuclear power plant, as set forth in claim 6, wherein a second connecting duct interconnects said intermediate coolers in each said group of intermediate coolers, and a tie line connecting said second connecting duct to the high-pressure stage of said compressor.

8. Nuclear power plant, as set forth in claim 1, wherein four said intermediate coolers are located within said tank and each said group of intermediate coolers consists of two said intermediate coolers with said intermediate coolers in each said group being connected to one said first connecting duct and to one said second connecting duct.

9. Nuclear power plant, as set forth in claim 1, wherein said turboset includes a compressor, and a flow line connecting said compressor to said recuperators.

10. Nuclear power plant, as set forth in claim 1, wherein said conduit means includes fittings accessibly arranged within said pressure tank.

* * * * *

UNITED STATES PATENT OFFICE
CERTIFICATE OF CORRECTION

Patent No. 4,050,984  Dated September 27, 1977

Inventor(s) Erhard Arndt et al

It is certified that error appears in the above-identified patent and that said Letters Patent are hereby corrected as shown below:

In the heading of the patent [30] should read as follows:

-- [30] Foreign Application Priority Data

Aug. 23, 1972  Germany.....P 22 41 426.2--

Signed and Sealed this

Third Day of January 1978

[SEAL]

Attest:

RUTH C. MASON
Attesting Officer

LUTRELLE F. PARKER
Acting Commissioner of Patents and Trademarks